Inventor:
André Matthey-Doret,

By Pierce + Scheffler,
Attorneys.

Patented Nov. 7, 1950

2,528,896

UNITED STATES PATENT OFFICE 2,528,896

PROTECTIVE ARRANGEMENT FOR ELECTRIC LINES

André Matthey-Doret, Wettingen, Switzerland, assignor to Aktiengesellschaft Brown, Boveri & Cie, Baden, Switzerland Application September 25, 1944, Serial No. 555,732 In Switzerland August 4, 1943

Section 1, Public Law 690, August 8, 1946 Patent expires August 4, 1963

7 Claims. (Cl. 175—294)

Under-voltage or low-impedance relays are often employed for the protection of electrical lines against short circuits, these relays coming into operation when a short circuit or earth fault occurs on the line with which the relays are associated, thus causing the line to be disconnected from the network either by direct or indirect actuation of the circuit breaker or breakers in question.

In the case of long or heavily loaded lines it may happen that when a short circuit or earth fault occurs near the end of the line the voltage or the total impedance at the beginning of the line where the relays are located only decreases very slightly and is not much smaller than during normal operation. It is then impossible to adjust the voltage or impedance relays so that they are certain to operate when a short circuit or earth fault occurs and at the same time remain inoperative during normal service.

Thus in order to ensure that the relays operate whenever necessary but not during normal service, according to the invention the under-voltage and low-impedance relays are not connected to the voltage of the switch station in which they are located but to an image of the voltage prevailing at a distant point of the line.

Figure 1:
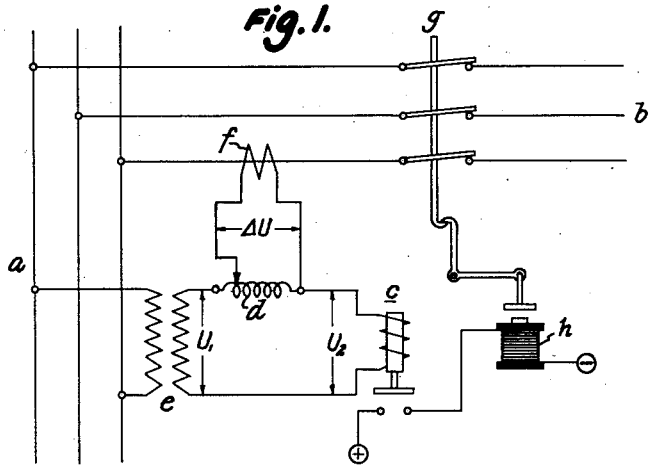
Figure 1 illustrates, diagrammatically, one embodiment of the invention.

In Fig. 1 line $b$ is a long branch line supplied from the bus-bars $a$ of a power station and this branch line is to be protected against short circuits by an under-voltage relay $c$ and trip coil $h$. According to the invention an impedance $d$ is now connected into the secondary circuit of the voltage transformer $e$ supplying the relay $c$, the magnitude of this impedance corresponding to the normal line impedance from the power station to the middle of line $b$; the phase current $J$ of line $b$ transformed by the current transformer $f$ flows through this impedance $d$. As soon as a short circuit occurs anywhere on the line $b$ a corresponding current $J$ flows through the impedance $d$ and causes here a voltage drop in the circuit of relay $c$ corresponding to the voltage drop which the short circuit produces in line $b$ up to its midpoint. Relay $c$ operates and energizes trip coil $h$ to open circuit breaker $g$ whereupon the line $b$ is disconnected from its current supply $a$.

Figure 2:
Figures 2 and 3 are vector diagrams which illustrate certain operating characteristics.
Figure 3:
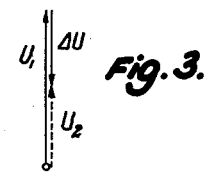

Fig. 2 shows the corresponding voltage diagram for normal service, whilst Fig. 3 is the diagram for a short circuit at the end of the line. According to Fig. 2 during normal service the voltage at the middle of the line $U_2$ is practically equal to the station voltage, whilst the inductance of the line compared with the ohmic load due to the consumer is of no importance. During normal service the normal load current $J$ causes a voltage drop $\Delta U$ across the self-inductance $d$ the vector of which is practically perpendicular to the voltage vectors $U_1$ at the beginning and middle of the line as well as to the image $U_2$ of this latter voltage. When a short circuit, however, occurs at the end of the line the inductance of the line is practically the only load present and consumes a large part of the network voltage $U_1$ still prevailing at the point where the relay is located. In order to obtain a potential drop here corresponding at least to the centre of the line, according to the invention a current $J$ proportional to the short circuit current is passed through the impedance $d$. This current then produces a voltage drop $\Delta U$ which, because the current $J$ lags practically 90° behind the voltage $U_1$, is further displaced by 90° relative to the current. The voltage drop $\Delta U$ is thus directed oppositely to the voltages $U_1$ and $U_2$ as shown in Fig. 3. By this means the voltage drop at the centre of the line is thus artificially shifted to the point $c$ where the relay is located.

Figure 4:
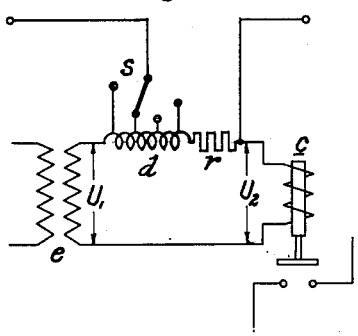
Figures 4, 5, 6 and 7 are fragmentary circuit diagrams illustrating modifications of the embodiment of the invention shown in Figure 1.
Figure 5:
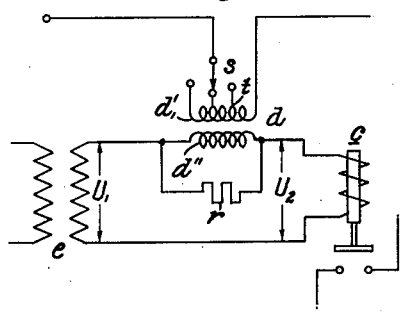

The substitute impedance $d$ could also have the current $J$ flowing directly through it as shown in Figure 4. It can also be constructed with two windings $d'$, $d''$, as shown in Figure 5, the primary winding $d'$ being fed directly with the network current whilst the voltage drop $\Delta U$ is induced in the secondary winding $d$. This impedance or the current transformer associated with it can be equipped with taps $t$ and a point switch $s$ as illustrated in Figures 4 and 5 to enable the impedance to be adjusted to suit the length of the line. In order to adjust the phase angle to that of the line a resistance $r$ can be connected in series, as in Figure 4, or parallel, as in Figure 5, with the impedance.

Figure 6:
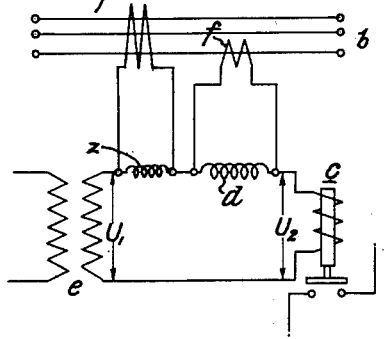

The invention can also be applied if the relays are used to clear earth faults. If it is then desired that the phase voltage to earth should be compounded, an impedance $z$ can be provided in the sum current circuit as shown in Figure 6, this impedance being suited to the earth impedance of the line. When only the voltage between phases has to be compounded, the impedance can be fed with interlinked current as from transformer device $f'$.

Figure 7:
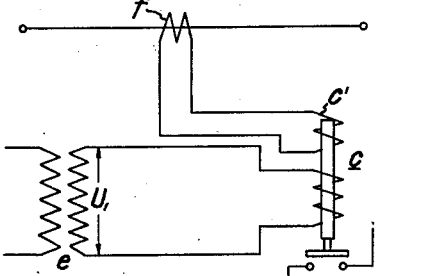

Instead of moving the image of the line section into a special additional impedance it can also be displaced into the relay itself as illustrated in Figure 7. For this purpose the voltage coil of relay c, which is connected to the station voltage, can be connected in opposition to a winding c' which is excited by the line current or a current proportional to this latter and having a suitable phase.

I claim:

1. For combination with a circuit breaker arranged at a power station to interconnect a relatively long branch circuit and a main circuit energized with alternating current and having tripping means, a protective relay at said station and which controls said tripping means, an energizing circuit for said relay extending from said main circuit, an impedance having a magnitude corresponding to the normal line impedance from the power station to substantially the middle of said branch circuit, and means producing a voltage across said impedance derived from the current flowing in said branch circuit, said voltage being of substantially opposite phase to the energizing voltage obtained from said main circuit upon an occurrence of a short circuit at the end of said branch circuit remote from said power station and opposed to the effect produced by energizing voltage with respect to energization of said relay.

2. The invention, as set forth in claim 1, wherein said impedance is connected in said relay energizing circuit and also in circuit with said branch circuit.

3. The invention, as set forth in claim 1, wherein said impedance is connected in said relay energizing circuit and in series with said energizing voltage.

4. The invention, as set forth in claim 1, wherein said impedance is connected in said relay energizing circuit and in series with said energizing voltage, and the said means producing the voltage across said impedance is comprised of a current transformer connected in said branch circuit, the secondary of said transformer being connected across said impedance.

5. The invention, as set forth in claim 1, wherein said impedance is connected in said relay energizing circuit and in series with said energizing voltage, and said impedance is in the form of a current transformer one winding of which is tapped to adjust the same for various lengths of branch circuits.

6. The invention, as set forth in claim 1, wherein said impedance and an auxiliary impedance are connected in said relay energizing circuit and in series with said energizing voltage, said auxiliary impedance being suited to the ground impedance of said branch circuit, and means impressing a voltage across said auxiliary impedance derived from the sum current of said branch circuit.

7. The invention, as set forth in claim 1, wherein the protective relay has two coils one of which is energized directly in accordance with the voltage derived from the main circuit and the other coil constituting said impedance is differentially related to said one coil and is energized in accordance with current in the branch circuit.

ANDRÉ MATTHEY-DORET.

REFERENCES CITED

The following references are of record in the file of this patent:

UNITED STATES PATENTS

| Number | Name | Date |
|---|---|---|
| 1,554,704 | Biermanns | Sept. 22, 1925 |
| 1,617,377 | Circhton | Feb. 15, 1927 |
| 1,732,977 | Mayr | Oct. 22, 1929 |
| 1,854,965 | Traver | Apr. 19, 1932 |
| 1,967,093 | Lewis | July 17, 1934 |
| 2,192,035 | Evans | Feb. 27, 1940 |
| 2,246,324 | Schroder | June 17, 1941 |
| 2,393,983 | Goldsborough | Feb. 5, 1946 |
| 2,404,955 | Goldsborough | July 30, 1946 |

FOREIGN PATENTS

| Number | Country | Date |
|---|---|---|
| 364,888 | Germany | June 14, 1921 |
| 586,465 | Germany | Oct. 21, 1933 |
| 188,426 | Switzerland | Apr. 1, 1937 |